July 12, 1932.  F. J. PEASE  1,866,721

COMBINED THERMOSTAT AND HYGROSTAT INSTRUMENT

Filed April 25, 1929

Inventor
Frederick J. Pease

By Wheeler, Wheeler & Wheeler
Attorneys

Patented July 12, 1932

1,866,721

UNITED STATES PATENT OFFICE

FREDERICK J. PEASE, OF WAUWATOSA, WISCONSIN

COMBINED THERMOSTAT AND HYGROSTAT INSTRUMENT

Application filed April 25, 1929. Serial No. 357,974.

This invention relates to improvements in a combined thermostat and hygrostat instrument.

It is the primary object of the invention to provide a novel, improved, and simplified means for controlling relative humidity, irrespective of temperature, and incidentally to control temperature also.

It is well known that relative humidity varies with the temperature, being measured in terms of the capacity of air to absorb moisture. The given quantity of moisture present in a given body of air at one temperature may receive a relatively high humidity, but if the temperature of the air is increased, its capacity to take up further moisture is likewise increased and the relative humidity drops accordingly.

Considerable difficulty has been experienced heretofore in making accurate instruments for recording relative humidity. The instruments generally have comprised two distinct types, one of which operates through changes in form or length of substances in accordance with the dryness or moistness of the air to which the air is subjected. The well known hygrostat employing a hair as its activating member is an example of this class of instruments. Such an instrument, however, is delicate and relatively inaccurate. The other types of instruments have included combinations of wet and dry bulb thermostats but these have either involved mental calculations or have been relative complex in structure.

The present instrument comprises a combination of wet and dry bi-metallic thermostatic elements, one of which is mounted directly upon the other, the two elements being opposed so that but for the evaporation taking place from the surface of one of them their net result would be zero at a predetermined point. At the dew point or 100% humidity the net result of their combined movement will likewise be zero. At any intermediate humidity, however, the two devices will produce a combined effect by which, through suitable electrical connections, a humidifying device of any desired construction may be controlled.

I propose further to simplify the device to which this invention relates by making both thermostatic elements from a single piece of bimetallic plate so arranged as to produce the requisite opposition of one thermostat to the other. As above indicated, I have also organized the device in such a way that the primary thermostat may be employed to control temperatures irrespective of humidity if desired.

In the drawing—

Like parts are identified by the same reference characters throughout the several views.

The base 5 is hollow and within it is provided a water chamber 6 with a filling tube 7 through which water may be introduced to supply the wick 8.

Figure 1:
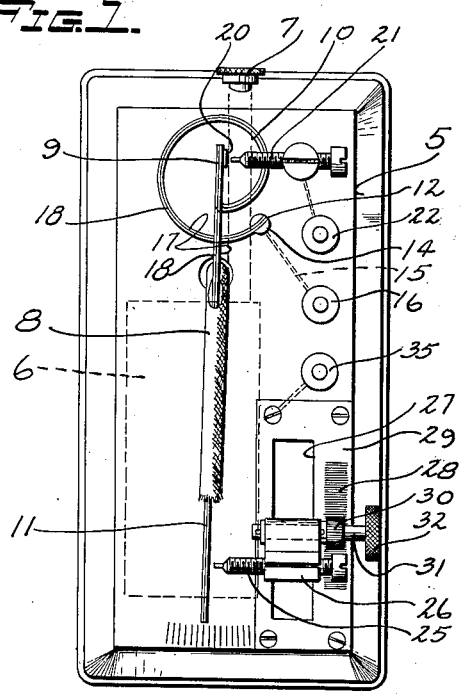
Figure 1 is a front elevation of the device embodying the invention.
Figure 2:
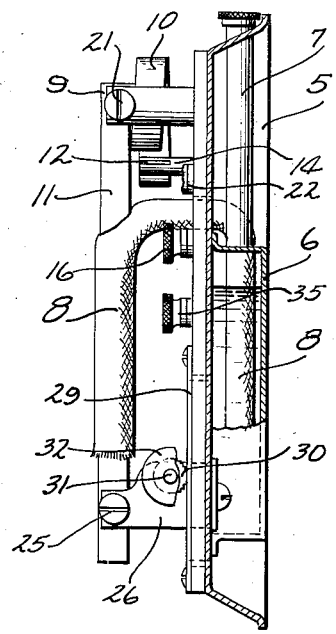
Figure 2 is a side elevation thereof partly broken away to a vertical section exposing the water chamber in the base upon which the apparatus is assembled.
Figure 3:
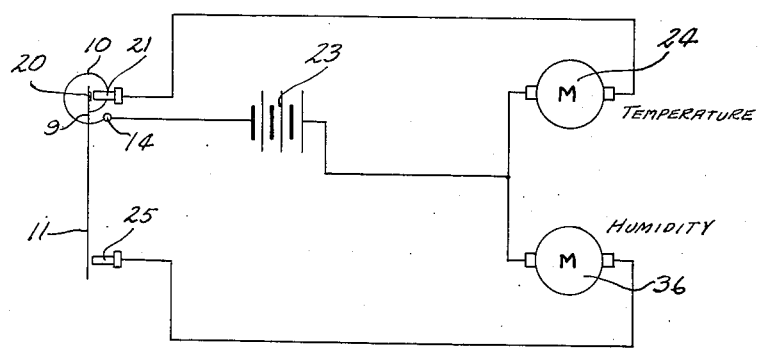
Figure 3 is a wiring diagram.

The thermostatic equipment may conveniently be made of a single piece of bimetallic plate longitudinally slit to a point near its upper end 9. The portion 10 of the thermostatic metal thus partially severed from the portion 11 thereof is bent into spiral form, as clearly shown in Figure 1, and its extremity 12 is anchored in a slotted post 14 electrically connected by a wire 15 with binding post 16.

The entire bimetallic element, including portions 10 and 11 thereof, is supported from its mounting in post 14. The arrangement illustrated is such that the ply 17 of metal in the bimetallic assembly will have a greater thermal coefficient of expansion than the ply 18. It will be noted that the ply 17 is on the inside of the spirally curved portion 10 of the thermostat and is disposed at the right (as viewed in Figure 1) of the straight portion 11.

The effect of variation of temperature on the coil 10 is to cause the free end thereof, including the entire thermostatic element 11, to move bodily in a general lateral direction.

It also has a pivotal movement used for thermostatic control by providing at 20 an electrical contact which, in the course of such movement, will move to and from an adjustable relatively fixed contact 21 electrically connected with binding post 22. If the contact 21 and post 14 are electrically connected in series between a battery 23 and a temperature controlling motor 24, the engagement and disengagement between the contacts 20 and 21 will serve to control the operation of motor 24 and such operation may be employed in the usual way to regulate the temperature to which the thermostat is subject.

The arrangement is such that if the thermostatic element 11 were not in itself flexible and subject to flexion proportionate to temperature variations, its entire length would move laterally from side to side in accordance with the movement of the free end of thermostatic element 10. Since the member 11 itself has a thermostatic response, however, and since it is in effect opposed to the operation of thermostatic element 10 due to the bending of the bimetallic plate from which these elements are formed, it will be found that the free end of element 11 will at one point remain substantially stationary. The movement produced by the flexing of thermostatic element 10 will be exactly balanced out by the opposite flexing movement of thermostatic element 11 when the two elements are operating under like conditions.

It is desired, however, to get a response of member 11 indicative of relative humidity and therefore member 11 does not operate under conditions identical with those to which member 10 is subject. The tubular wick 8, apertured to receive member 11, conveys from reservoir 6 a supply of water which evaporates from the exposed portion of the wick at a rate determined by the relative humidity. If the humidity is low, the evaporation will take place at a relatively rapid rate whereas if the humidity approaches the dew point, the rate of evaporation will drop to zero.

The evaporation will lower the temperature to which thermostat 11 is subject and the drop in temperature will be proportionate to the rate of evaporation. At the dew point, therefore, when no evaporation occurs, some determinable portion of thermostatic element 11 adjacent its free end will remain motionless and unresponsive to temperature changes, as will likewise be the case if the wick 8 is dry. When the wick 8 is wet, as it will normally be kept by water in reservoir 6, it will be obvious that the movement of the extremity of thermostatic element 11 will be a function of the dry operation of thermostatic member 10 and the moist operation of thermostatic member 11, their combined results being algebraically added by virtue of the fact that they are in series, opposed to each other, and supported only from the remote end of the series. The net result will be a movement of the free end of thermostatic element 11 which is generally proportioned to the relative humidity, regardless of specific temperatures. It is particularly to be noted that this result is obtained without the use of any levers or equalizing systems.

In order to utilize this device for the control of humidity, I provide at 25 a contact with which the free end of thermostatic element 11 is engageable. This contact preferably takes the form of a screw adjustable in a support 26 which, in itself, constitutes a slide movable in a guideway 27 substantially parallel to the normal axis of thermostatic element 11. The position of the slide in its guideway may be adjusted by means of a rack 28 comprising teeth formed in the plate 29 in which the guideway is cut and a pinion 30 mounted on a shaft 31 journalled in the slide or support 26 and controlled by means of a knob 32.

The plate 29 is electrically connected with a binding post 35 and in actual service is electrically connected in series with a motor 36 controlling any desired humidifying device, the return lead from the motor passing to battery 23 and thence to the thermostatic mechanism 9.

Although the operation of the device will be readily apparent from the foregoing description, it will be briefly summarized.

The thermostatic appliance 9 comprises two thermostats 10 and 11 which, in the instant device, are component parts of a single bimetallic plate. The arrangement is such that the separate thermostatic devices are in series and supported from one end of the series whereby the free end is subject to the combined action of two opposed thermostats. One of these is subjected to the variable cooling influence of the evaporation of water in proximity to its surface, such evaporation and the cooling effect produced thereby being proportioned to the dryness of the surrounding air. It is immaterial which of the thermostats is subject to this cooling influence except that the location of the contact points may necessarily be changed from one side to the other of the thermostats according to which is cooled.

Adjustment is provided for contact 25 in order that such contact may be set in a position directly opposite that portion of thermostat 11 which has zero movement when there is no evaporation from the wick 8 due either to the absence of water on such wick or to the saturation of the surrounding air. The contact 25 will be so set, in this position, that it will be spaced slightly from the said portion of the thermostat.

With the parts in this position, assume the humidity to be substantially that which it is desired to maintain, the motor 36 being at rest. It will be obvious that an increase of temperature unaccompanied by any addition of moisture to the air surrounding the instrument will cause the spiral coil 10 to expand thereby moving the entire thermostatic element 11 to the right, as viewed in Figure 1. The same change in temperature which produces this movement, however, will flex thermostatic element 11 additionally thereby attempting to move its extremity toward the left. But for the lag produced by evaporation from the wick 8, the extremity of thermostatic element 11 would move to the left sufficiently to compensate for its bodily movement to the right. It must be apparent, however, that due to the increase of temperature with no increase of moisture to the surrounding atmosphere, the relative humidity has been lowered and accordingly the rate of evaporation and the consequent cooling effect of the wick 8 will be enhanced, thereby increasing the lag of the free end of thermostatic element 11. Because of this lag, the extremity of thermostatic element 11 will not move to the left sufficient to compensate for the bodily change in position of such element and contact will ultimately be established between the said extremity of element 11 and the screw 25 thereby closing the circuit to motor 36 and setting in operation the humidifying device for adding moisture to the atmosphere.

The same result is achieved if the temperature remains constant and the relative humidity drops due to condensation or other replacement of moist air with dry air. In such cases the increased evaporation from wick 8 will cool thermostatic element 11 permitting it to straighten slightly and thereby to make contact with screw 25.

A rise in humidity will break the contact between the wet thermostat 11 and screw 25 thereby allowing motor 36 to come to rest, whether such increase in humidity is attributable to a drop in temperature or the addition of moisture. It will be remembered that the natural temperature response of the wet thermostat 11, as manifested by the curvature thereof, will be decreased by evaporation from wick 8 and insofar as the humidity rises for any reason the rate of evaporation from the wick will be reduced, thereby permitting the bar 11 to curve more sharply and thus to break its contact with screw 25.

The temperature control is supplemental and merely makes use of mechanism which is necessary to the function of humidity control. Contacts 20 and 21 move to and from engagement in direct response to the variations in temperature within a range determined by the setting of the screw contact 21.

No appliances controlled by motor 24 and 36 have been illustrated for the reason that such appliances are well known and constitute no necessary part of the present invention. The motor device 24 may open or shut the drafts of a heating plant or open or close communicating valves in heating pipes. The motor 36 may operate a mechanical spraying device or a fan associated with a source of moisture or it may, without change in principle, be replaced by an electrical resistance which will vaporize the water. It is intended that the conventional illustration of motors 24 and 36 should represent any desired means of controlling the respective functions of heating or humidifying the atmosphere surrounding the control instrument to which this invention relates.

I claim:

1. In a device of the character described, the combination of two thermostats, one of which is relatively fixed and the other depending from the first so as to be entirely freely movable within a predetermined range, one of the thermostats being subject to the effect of evaporation whereby the combined results of the thermostats is a function of wet and dry temperatures.

2. In a device of the character described, the combination of two thermostats, one of which is fixed and the other depending from the first so as to be entirely freely movable within a predetermined range, said thermostats being opposed as to direction of operation, and means for rendering one of said thermostats subject to the chilling effect of the evaporation of moisture whereby the combined result of said thermostats at the end of the freely movable thermostat is proportioned to relative humidity.

3. In a device of the character described, the combination with a pair of multi-ply thermostats, in which the metal having a higher coefficient of expansion is disposed at opposite sides of the two thermostats, means for supporting one of said thermostats solely at its end with its other end entirely free, means for supporting the other of said thermostats solely at its end and from the free end of the first mentioned thermostat, a reservoir, and a wick leading from said reservoir and associated intimately with one of said thermostats, whereby the free end of the second mentioned thermostat will move in response to a function of dry temperatures opposed by wet temperatures.

4. In a device of the character described, a compound thermostat comprising a plurality of bimetallic thermostats formed integrally of a single piece of bimetallic sheet and having their respective high and low coefficient portions oppositely disposed.

5. In a device of the character described, a compound thermostat formed integrally from a single bimetallic plate, one portion of said plate being bent in one direction and another in an opposite direction from the point of union of said portions, whereby the respective high and low coefficient portions of said thermostat are reversed in said portions.

6. In a device of the character described, a compound thermostat comprising integrally a single piece of bimetallic plate slit to provide two thermostatic elements joined at one end of said plate, one of said elements being arcuately formed whereby its temperature response will be opposed to that of the other of said elements.

7. In a device of the character described, the combination with a support, of a compound thermostat mounted thereon comprising an arcuately extending bimetallic element having a fixed end and otherwise entirely free for a given direction of temperature response, and a second bimetallic element carried by the free end of said first mentioned element and having an opposite direction of temperature response, a reservoir for liquid, and means for delivering liquid to the surface of one of said thermostatic elements.

8. In a device of the character described, a compound thermostat comprising two mutually opposed thermostatic members connected together in series and having a free end, one of said thermostats being mounted upon the other, and means for vaporizing a liquid in proximity to the thermostat so supported whereby the supporting thermostat will have a dry bulb temperature response.

9. In a device of the character described, the combination with a compound thermostat comprising two opposed bimetallic thermostatic members connected together in series and supported wholly at one end, temperature regulating means operatively arranged to be actuated by the supporting thermostatic members, humidification regulating means arranged to be actuated by the free end of the supported thermostatic members, and means for supplying a vaporizable liquid to said supported member, the supporting member being arcuately curved.

10. A device of the character described comprising the combination with temperature and humidity regulating means, of a single bi-metallic strip integrally providing controls for both of said means, said strip being supported at one end and having portions reversed as to direction of operation freely movable with respect to the supported end, the portion most remote from said supported end being provided with means for evaporating liquid in proximity thereto.

FREDERICK J. PEASE.